United States Patent [19]

Gekat

[11] Patent Number: 4,955,035
[45] Date of Patent: Sep. 4, 1990

[54] MICROWAVE-PUMPED, HIGH-PRESSURE, GAS-DISCHARGE LASER

[75] Inventor: Frank Gekat, Leinfelden-Echterdingen, Fed. Rep. of Germany

[73] Assignee: Deutsche Forschungs -und Versuchsanstalt fuer Luft- und Raumfanrt eV., Bonn, Fed. Rep. of Germany

[21] Appl. No.: 276,445
[22] PCT Filed: Mar. 11, 1988
[86] PCT No.: PCT/DE88/00137
§ 371 Date: Nov. 14, 1988
§ 102(e) Date: Nov. 14, 1988
[87] PCT Pub. No.: WO88/07272
PCT Pub. Date: Sep. 22, 1988

[30] Foreign Application Priority Data

Mar. 14, 1987 [DE] Fed. Rep. of Germany ....... 3708314

[51] Int. Cl.$^5$ .............................................. H01S 3/09
[52] U.S. Cl. ....................................... 372/69; 372/70; 372/87
[58] Field of Search ....................... 372/69, 70, 81, 83, 372/84, 87

[56] References Cited

U.S. PATENT DOCUMENTS

| | | | |
|---|---|---|---|
| 3,748,594 | 7/1973 | Pugh | 372/58 |
| 3,753,152 | 8/1973 | Pettipiece | 372/64 |
| 4,004,249 | 1/1977 | Kikuchi | 372/58 |
| 4,393,506 | 7/1983 | Laakmann et al. | 372/59 |
| 4,414,488 | 11/1983 | Hoffmann et al. | 372/64 |
| 4,513,424 | 4/1985 | Waynant et al. | 372/68 |
| 4,618,961 | 10/1986 | Sutter, Jr. | 372/87 |
| 4,631,732 | 12/1986 | Christensen | 372/87 |
| 4,780,881 | 10/1988 | Zhang et al. | 372/81 |

FOREIGN PATENT DOCUMENTS 2002705 9/1970 Fed. Rep. of Germany .
2735299 2/1979 Fed. Rep. of Germany .
3111305 10/1982 Fed. Rep. of Germany .

OTHER PUBLICATIONS

Article "Design Considerations for Pumping of Rare Gas Halide Lasers", by Waynant, Christensen and Bollen, Jr., Topical Meeting on Excimer Lasers, 1/83, pp. MA4-1-MA4-5.
Article "Improved Performance of the Microwave-Pumped XeCl Laser", by Wisoff, Mendelsohn, Harris and Young, IEEE Journal of Quantum Electronics, vol. OE-18, No. 11, Nov. 1982.
Article "Microwave-Excited Ionized Laser with External Magnetic Field", by Katsurai and Sekiguchi, Electronics and Communications in Japan, vol. 54-B, No. 1, 1971.
German Article entitled " ", Archiv Fur Elektrotechnik, Published in XII. Band, 1923, by W. Rogowski.
Article entitled "A Novel Analytical Design Method for Discharge Laser Electrode Profiles", by E. A. Stappaerts, Published in Applied Physics Letters, 40(12), 15 Jun., 1982.
Article entitled "Improved Uniform-Field Electrode Profiles for TEA Laser and High-Voltage Applications", by Chang, The Review of Scientific Instruments, vol. 44, No. 4, Apr. 1973.
Article entitled "Excimer Laser Pumped by an Intense Relativistic Microwave Source", by Didenko et al., Soviet Technical Physics Letters, 12(10), Oct. 1986.
NRL Memorandum Report 5432 entitled "The Effects of Surface Waves on RF Discharge Pumped Lasers", By Waynant, Christensen and Bollen, Jr., published in DD Form 1473, of Office of Naval Research, Jan. 30, 1985.

Primary Examiner—Frank Gonzalez
Attorney, Agent, or Firm—Kramer, Brufsky & Cifelli

[57] ABSTRACT

In order to so improve a microwave-pumped, high-pressure, gas-discharge laser, in particular, excimer laser, with an optical resonator, with a resonator gas volume arranged therein and extending along an optical axis thereof, with a microwave coupling structure enclosing the resonator gas volume within it and with a microwave generator connected to the microwave coupling structure, that a wall breakdown is substantially suppressed, it is proposed that a central area with an electric field intensity lying above a threshold value for a high-pressure gas discharge be disposed within the resonator gas volume in a transverse direction to the optical axis and be adjoined on both sides thereof by outer areas with a field intensity lying below the threshold value for the high-pressure gas discharge.

34 Claims, 4 Drawing Sheets

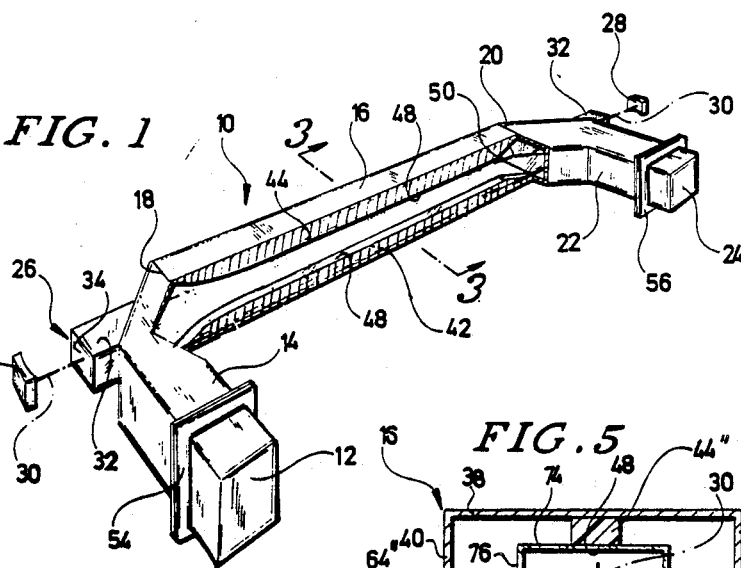
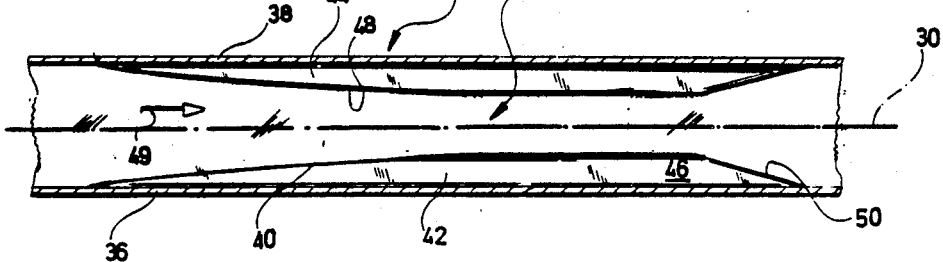
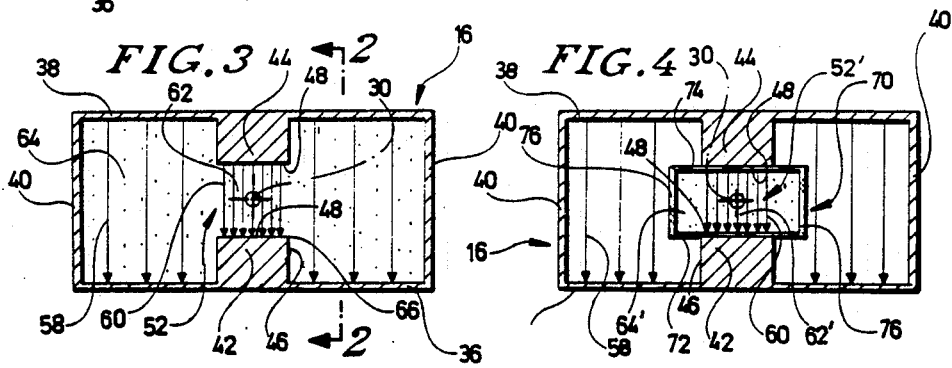

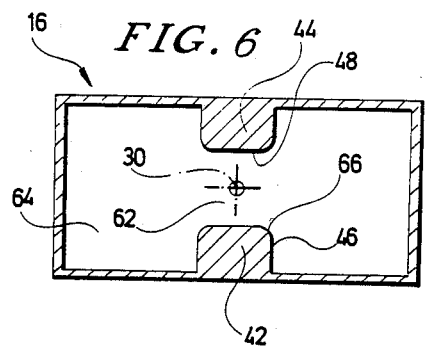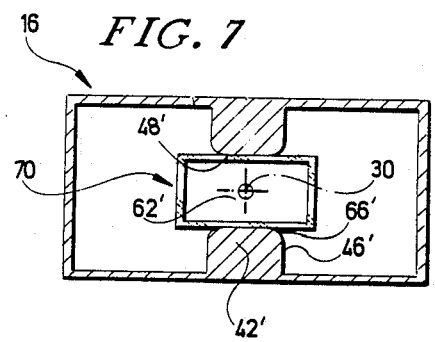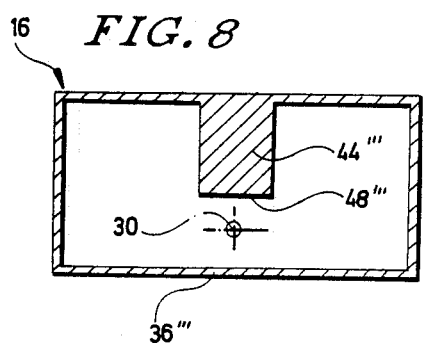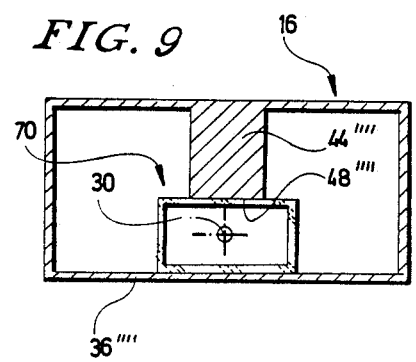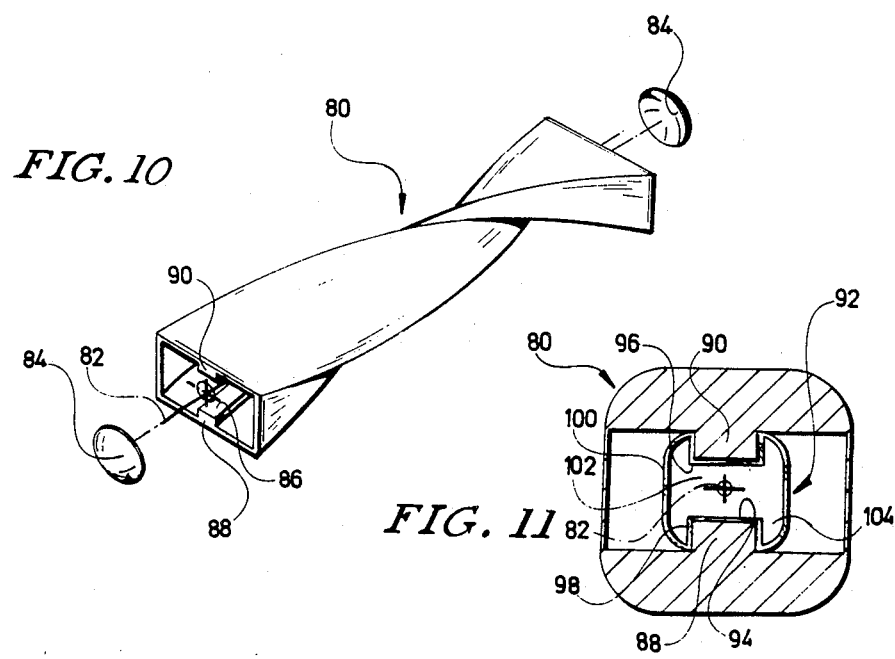

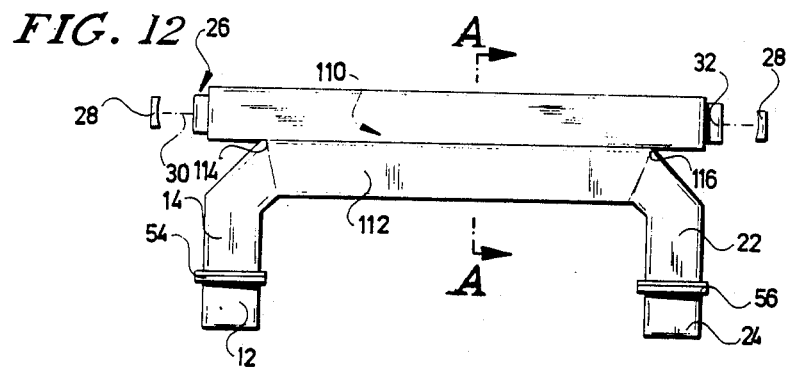
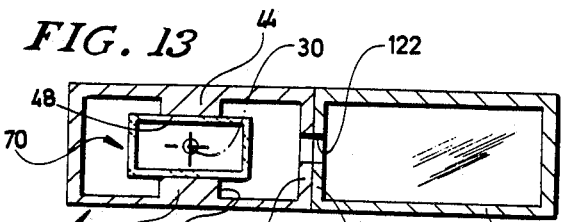
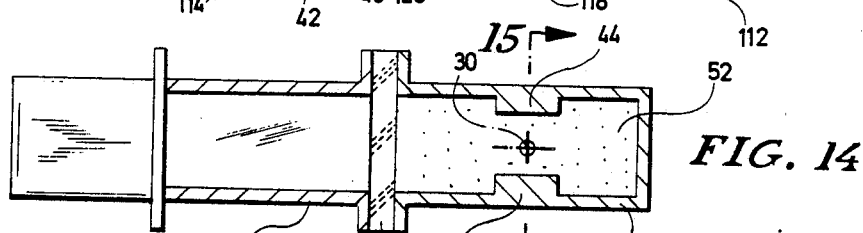
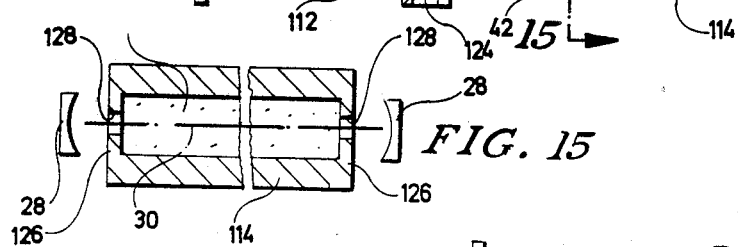
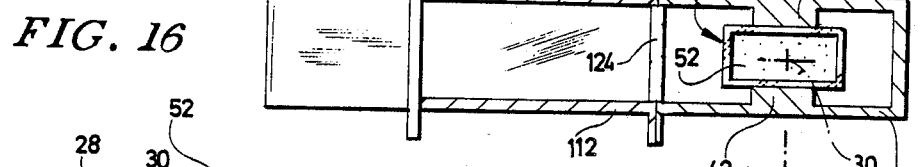
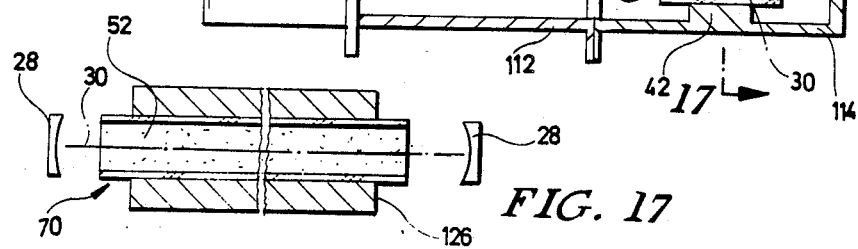

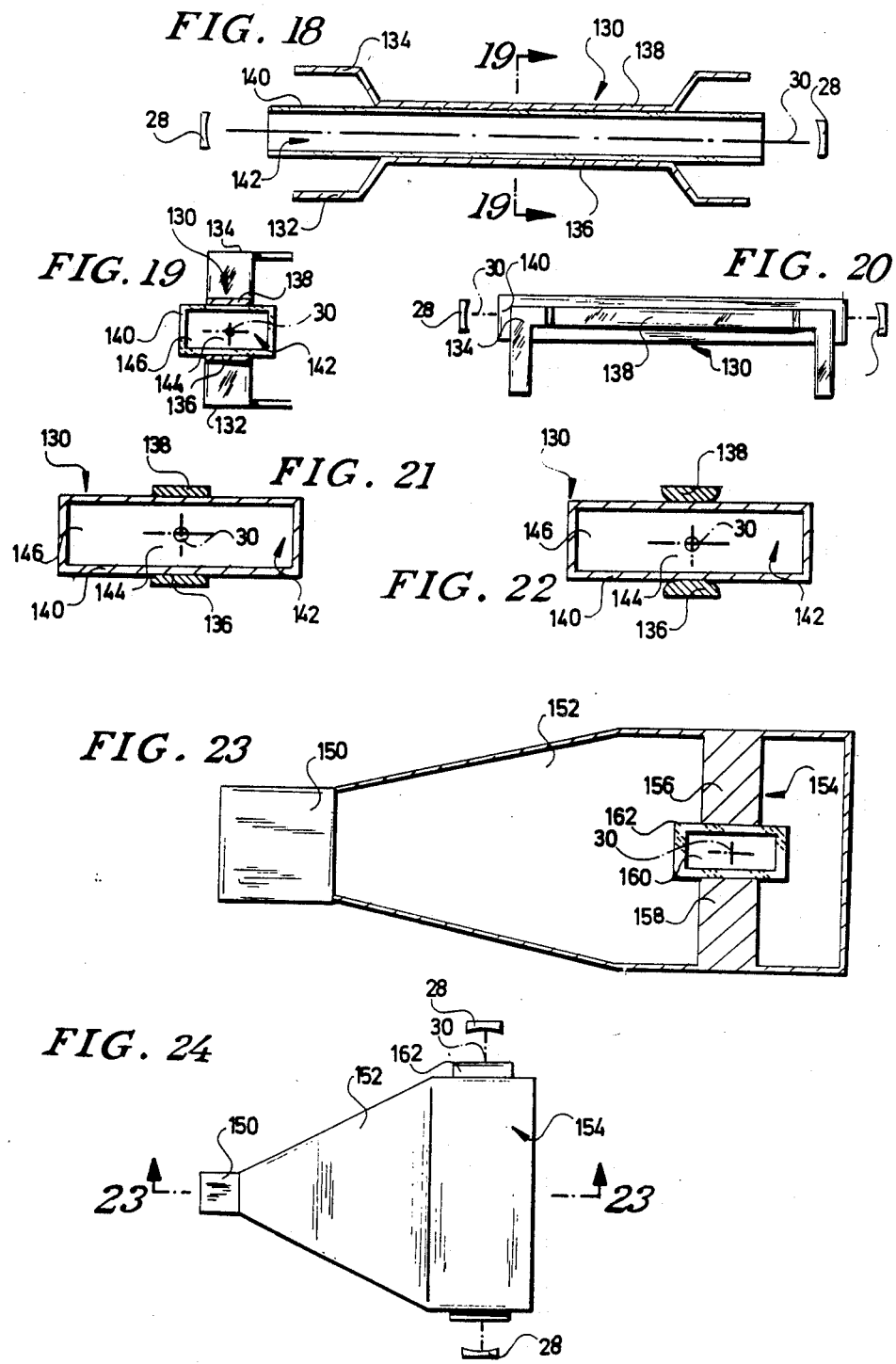

MICROWAVE-PUMPED, HIGH-PRESSURE, GAS-DISCHARGE LASER

The invention relates to a microwave-pumped, high-pressure, gas-discharge laser, in particular, an excimer laser, with an optical resonator, with a resonator gas volume arranged therein and extending along an optical axis thereof, with a microwave coupling structure enclosing the resonator gas volume within it and with a microwave generator connected to the microwave coupling structure.

Such high-pressure, gas-discharge lasers operate with pressures greater than or equal to 100 mbar, an electric power density greater than or equal to 1 kilowatt per $cm^3$ in relation to an active resonator gas volume and a frequency greater than or equal to 100 MHz, in particular, in the microwave range. Excimer lasers are a particularly preferred type of these high-pressure, gas-discharge lasers.

In such high-pressure, gas-discharge lasers, the active resonator gas volume is enclosed in a tube which extends coaxially with the optical axis and is positioned in an area of maximum electric field intensity within the microwave coupling structure. A high-pressure gas discharge is ignited and maintained in the resonator gas volume by the microwave excitation. Laser action occurs by gas particles which have been excited to their laseractive levels by the high-pressure gas discharge emitting coherent light. However, a precondition of optimal laser action is that this emission occur near the optical axis of the resonator.

Owing to the high pressure and the resulting high electron density in such a high-pressure gas discharge, however, a phenomenon referred to as wall breakdown and constituting a spatial instability of the discharge occurs. In this wall breakdown, the energy of the electrons contained in the gas discharge and hence also the emission of the gas particles in the area of wall surfaces of the tube is substantially greater and decreases towards the center, i.e., towards the optical axis. The emission even frequently has a minimum in the area of the optical axis.

Such effects are known, for example, from the paper presented by R. W. Waynant, D. P. Christensen and W. M. Bollen, Jr., entitled "Design Considerations for RF Pumping of Rare Gas Halide Lasers", published in Topical Meeting on Excimer Lasers 1/83 in Incline Village, Nev..

Heretofore, in order to avoid such a wall breakdown, a tube with a diameter which is as small as possible has been chosen so that the effect of the emission minimum in the area of the optical axis is only insignificant.

Aside from adjustment problems resulting from such small diameters of the resonator gas volume, such a decrease in the resonator gas volume is unacceptable, in particular, in commercial laser applications. Also, in spite of the reduction in the cross-section of the tube, the wall breakdown adversely affects the laser power and also the mode purity for these are known to always be optimal in the case of stable resonators when the emission is greatest in the area of the optical axis.

Proceeding from this prior art, the object underlying the invention is to so improve a high-pressure, gasdischarge laser of the generic kind that a wall breakdown is substantially suppressed.

This object is accomplished in accordance with the invention in a high-pressure, gas-discharge laser of the kind described at the beginning by a central area with an electric field intensity being above a threshold value for a high-pressure gas discharge being disposed within the resonator gas volume in a transverse direction to the optical axis and being adjoined on both sides thereof by outer areas with a field intensity being below the threshold value for the high-pressure gas discharge.

The field structure created by the inventive solution enables substantial suppression of a wall breakdown as the high-pressure gas discharge transversely to the optical axis is no longer bounded on all sides by wall surfaces and so a typical wall breakdown with a maximum emission in ring-shaped arrangement around the optical axis can no longer be formed because the laser gas in the resonator gas volume carrying out the high-pressure gas discharge is only surrounded by laser gas which, in turn, does not carry out a high-pressure gas discharge.

In an advantageous embodiment of the high-pressure, gas-discharge laser according to the invention, provision is made for the field intensity to change abruptly at the transition from the central to the outer areas. As a result of this additional requirement, the high-pressure gas discharge in the resonator gas volume is stabilized in the central area and does not extend transversely to the optical axis beyond this central area, for example, in the case of small pressure or power fluctuations, in the direction of the outer areas, thereby likewise contributing, in turn, to instability of the high-pressure gas discharge with respect to space and time.

In the embodiments described so far, it has not been specified how the resonator gas volume is to be arranged in the microwave coupling structure. A preferred possibility is for the resonator gas volume to be enclosed by a gas tube. This has the advantage that the amount of gas for the resonator gas volume may be kept low and that no problems arise regarding the closing-off of the microwave coupling structure from the microwave generator which the resonator gas should not enter. Also, this gas tube may be provided with windows, in particular, Brewster windows, at the end faces so that exit of the laser beam from the resonator gas volume also poses no problems.

Expediently, provision is made for the gas tube to be made of dielectric material.

In another preferred embodiment of the high-pressure, gas-discharge laser according to the invention, provision is made for the resonator gas volume to be enclosed by the microwave coupling structure. The advantage of such a design is that no additional gas tube is required, which eliminates all of the problems arising therefrom. In that case, however, the microwave coupling structure itself must be sealed off in a gas-tight manner from the microwave generator and the other microwave waveguides and it must also have window openings for the laser beam to be coupled out. It is particularly expedient for the resonator gas volume to extend in the transverse direction to the optical axis beyond the areas penetrated by the electric field intensity.

As explained at the beginning, one of the objects of the high-pressure, gas-discharge laser according to the invention is to create a high-pressure gas discharge which is as homogeneous as possible with respect to space. Since the threshold value for the electric field intensity at which such a high-pressure gas discharge occurs and the pressure of the laser gas are correlated with one another, with a field intensity gradient transversely to the optical axis a spatial fluctuation of the areas of maximum emission could occur in the central area as a result of slight pressure fluctuations in the resonator gas volume. The same effect could be caused by fluctuations in the electric field intensity. For this reason, it is advantageous for the field intensity to be constant within the central area transversely to the optical axis so that even fluctuations in the electric field intensity or the pressure in the resonator gas volume do not cause any spatial shifts in the areas of maximum emission within the central area.

In the embodiments of the high-pressure, gas-discharge laser according to the invention described so far, it has not been specified in detail how a direction of propagation of the microwaves should extend relative to the optical axis and hence also to the resonator gas volume. It is, for example, advantageous for the direction of propagation of the microwaves in the microwave coupling structure to extend parallel to the optical axis. The advantage of such a design is that in particular with travelling waves, an averaging of locally different electric field intensities along the optical axis occurs and hence a homogeneous excitation of the entire resonator gas volume is achieved in the mean value with respect to time.

In order for the excitation and power absorption of the resonator gas to be as uniform as possible throughout the entire microwave coupling structure, it is advantageous for the electric field intensity in the central area to be constant along the direction of propagation of the microwaves.

On the other hand, it may also be advantageous for the direction of propagation of the microwaves in the microwave coupling structure to run transversely to the optical axis as a homogeneous electric field along the optical axis is then achievable in an extremely simple way.

In the microwave coupling structure, it is, in principle, also possible to provide two different types of design. For example, in order to average inhomogeneities of the electric field, it is advantageous for the microwave coupling structure to be a travellingwave structure. In contrast, a resonant microwave coupling structure offers the advantage of generating an increased electric field in the area of the optical axis, but has the disadvantage that the electric field intensity along the optical axis may be inhomogeneous.

The microwave coupling structure as such has not yet been defined in detail in terms of its physical features. It may be of any chosen design as long as it is capable of generating the inventive electric field distribution relative to the resonator gas volume. In a special embodiment of a microwave coupling structure, provision is made for it to have one conductor arranged above and one conductor arranged below the resonator gas volume.

This conductor does not have to face the resonator gas volume directly. It is, for example, also possible to arrange a dielectric between the conductor and the resonator gas volume as this does not result in a reduction of the electric field intensity between the conductors.

In order for these conductors to clearly define a central area in the resonator gas volume in which the electric field intensity exceeds a threshold value for the high-pressure gas discharge, provision is made for at least one of the conductors to extend with a constant width in the direction of the optical axis of the resonator gas volume. This conductor with its constant width defines an area of field intensity in which the conditions for a high-pressure gas discharge exist, whereas the field intensity does not exceed the threshold value for the high-pressure gas discharge at the sides of the conductor. In this case, the microwave coupling structure may likewise consist of conductive material at the sides of the conductor, but the conductor is to be so arranged that it causes relative to its surroundings an electric field intensity which exceeds the threshold value for the high-pressure gas discharge.

One possibility of generating such an electric field is for at least one of the conductors to have a rectangular cross-section and to cause an increased electric field by virtue of its shorter spacing from the opposite conductor relative to the other wall areas of the microwave coupling structure.

The homogeneity of the electric field may be further improved by the conductors having a profiled crosssection similar to a Stappaerts, Chang or Rogowski profile.

In the embodiments described so far, it has not been indicated how the microwaves are to be coupled into the microwave coupling structure itself. It is, for example, possible to design the microwave coupling structure in a travelling-wave system simply as part of a microwave waveguide. This does, however, have the disadvantage that the field intensity along the microwave coupling structure decreases on account of the energy absorption by the high-pressure gas discharge occurring along this microwave coupling structure. For this reason, it is advantageous for the microwave coupling structure to be coupled to a microwave waveguide by a directional coupler structure as a variation of the coupling of the microwave coupling structure to the microwave waveguide is thereby possible. It is most expedient for the directional coupler structure to be so designed that there is a substantially uniform field intensity distribution in the direction of the optical axis in the microwave coupling structure. This is achievable in a simple manner by variation of the coupling factor along the optical axis.

In a particularly preferred embodiment of a microwave coupling structure, provision is made for it to be a waveguide structure, i.e., the microwaves propagate within a waveguide. In this case, it is particularly advantageous for the waveguide structure to have at least one inwardly protruding ridge which projects from the waveguide in the interior of the waveguide structure. It is, however, even more advantageous for two opposed ridges to be disposed in the waveguide. These ridges may then either consist of dielectric material or be in the form of conductors.

In order to achieve a constant field intensity in the central area in the longitudinal direction of the microwave coupling structure, provision is made for either one or both of the ridges to have a front surface extending in the longitudinal direction of the optical axis at an incline thereto.

On the other hand, it is, however, also conceivable for the microwave coupling structure to be designed as TEM waveguide structure comprising coupling conductors. In this case, the propagation of the microwaves occurs between two strip conductors arranged in spaced, parallel relationship to one another.

In order to achieve a constant field intensity in the longitudinal direction of the optical axis in this case, too, provision is made in this structure for at least one coupling conductor to extend in the longitudinal direction of the optical axis at an incline thereto.

No specific details of the design of the resonator gas volume itself have been given. It is advantageous for the resonator gas volume to be a closed volume, i.e., if the resonator gas is a standing gas. Additional difficulties regarding the spatial stability of the high-pressure gas discharge are thereby avoided.

In contrast, particularly when it is a question of working with high powers, it is expedient for gas to flow through the resonator gas volume because regeneration and possibly also cooling of the resonator gas outside are thereby possible.

In order to avoid disturbances in the laser emission due to reflections, it is advantageous for surfaces facing the central area of the resonator gas volume to be of non-reflecting design. More particularly, it is conceivable for surfaces of the conductors facing the central area of the resonator gas volume to be of nonreflecting design. Additional improvements, in particular, when a gas tube is used, are enabled by surfaces of the gas tube facing the central area of the resonator gas volume being of non-reflecting design.

Finally, it may be expedient for the microwave coupling structure to be helically twisted around the optical axis as uniform excitation in the radial direction with respect to the optical axis is thereby achievable.

Further features and advantages of the high-pressure, gas-discharge laser according to the invention are the subject of the following description and the drawings of several embodiments. The drawings show:

FIG. 1 a schematic, broken-open illustration of a first embodiment;

FIG. 2 a partial view from the broken-open area in FIG. 1;

FIG. 3 a section along line 3—3 in FIG. 1;

FIG. 4 a second variant of the first embodiment;

FIG. 5 a third variant of the first embodiment;

FIG. 6 a modification of the first embodiment in FIG. 3;

FIG. 7 a modification of the second variant in FIG. 4;

FIG. 8 a fourth variant of the first embodiment;

FIG. 9 a fifth variant of the first embodiment;

FIG. 10 a second embodiment;

FIG. 11 a variant of the second embodiment;

FIG. 12 a third embodiment of the high-pressure, gas-discharge laser according to the invention;

FIG. 13 a section along line A—A in FIG. 12 of a first variant;

FIG. 14 a section along line A—A in FIG. 12 of a second variant;

FIG. 15 a section along line 15—15 in FIG. 14;

FIG. 16 a section along line A—A in FIG. 12 of a third variant;

FIG. 17 a section along line 17—17 in FIG. 16;

FIG. 18 a fourth embodiment of the high-pressure gasdischarge laser according to the invention;

FIG. 19 a section along line 19—19 in FIG. 19;

FIG. 20 a plan view of the fourth embodiment in FIG. 18;

FIG. 21 a cross-section through a first variant of the fourth embodiment;

FIG. 22 a cross-section through a second variant of the fourth embodiment;

FIG. 23 a section along line 23—23 in FIG. 24 through a fifth embodiment of the highpressure, gas-discharge laser according to the invention;

FIG. 24 a plan view of the fifth embodiment.

A first embodiment of an inventive high-pressure, gasdischarge laser which is designated in its entirety 10 and is illustrated in FIGS. 1 to 4 comprises a microwave generator 12 to which there is connected a waveguide section 14 which leads to a microwave coupling structure 16 and is connected with an input 18 of this microwave coupling structure 16. A waveguide section 22 terminated by a microwave dump 24 is, in turn, is connected to an output 20 of the microwave coupling structure.

An optical resonator designated in its entirety 26 comprises two mirrors 28 arranged concentrically with an optical axis 30. The optical axis 30 extends coaxially through the microwave coupling structure 16 which has on the side of its input 18 and on the side of its output 16 one extension 32, in each case, which is terminated by an optically permeable window 34.

As shown in FIG. 1, the entire microwave coupling structure 16 is a rectangular waveguide with a bottom wall 36, a top wall 38 and two side walls 40. This waveguide extends from its input 18 to its output 20 along the optical axis 30 extending centrally through it. Both the bottom wall 36 and the top wall 38 are each provided with a ridge 42 and 44, respectively, at the center thereof. These ridges likewise extend parallel to the optical axis in the longitudinal direction of the microwave coupling structure and rise from an inner side of the bottom wall 36 and the top wall 38, respectively, and protrude into an interior of the waveguide. Each ridge 42, 44 comprises two side surface 46 substantially parallel to the side walls 40 as well as a front surface 48 extending approximately parallel to the respective bottom or top wall 36, 38 and facing the optical axis 30. The ridges 42, 44 extend in the microwave coupling structure 16 from its input 18 to its output 20 and are provided with a slant 50 in the area of the input 18 and the output 20, respectively, and hence terminate in this area.

In the first embodiment 10 described herein, the entire microwave coupling structure is filled with a resonator gas and so a resonator gas volume 52 is substantially identical with an inside volume of the microwave coupling structure. The resonator gas additionally fills an interior of the respective extensions 32 and is closed off from the environment by the windows 34 of these extensions 32.

Gas-tight microwave windows 54 and 56, respectively, are also advantageously disposed between the microwave generator 12 and the waveguide section 14 and between the waveguide section 22 and the microwave dump 24 to prevent resonator gas from entering the microwave generator 12 or the microwave dump 24.

In FIG. 3, the field intensity generated in the area of the microwave coupling structure 16 by the microwaves passing through the microwave coupling structure 16 is indicated by arrows 58 and 60. As is clearly apparent from FIG. 3, the field intensity between the two front surfaces 48 of the ridges 42 and 44, indicated by arrows 60, is substantially greater than at the sides of the ridges 42, 44 between the bottom wall 36 and the top wall 38, indicated by arrows 58. Hence a central area 62 with a high field intensity is formed in the resonator gas volume 52 by the high field intensity between the ridges 42 and 24 or their front surfaces 48, respectively, and is adjoined by an outer area 64 at the sides of the ridges 42, 44.

In order to obtain an abrupt change in the field intensity between the ridges 42 and 44, in accordance with the invention these ridges 42, 44 are of rectangular design, i.e., the side surfaces 46 extend substantially perpendicularly to the front surfaces 48. Hence the field intensity at a side edge 66 formed by the front surface 48 and the side surface 46 of the ridges 42, 44 changes abruptly as indicated by arrows 60 and 58 in FIG. 3.

In accordance with the invention, the field intensity between the ridges 42 and 44, indicated by arrows 60, is selected so high that it lies above a threshold value for a high-pressure gas discharge of the resonator gas in this central area. Also, the field intensity indicated by arrows 58 at the sides of the ridges 42, 44 is selected so low that it lies below the threshold value for the high-pressure gas discharge.

In order to achieve excitation of the resonator gas which is as uniform as possible along the optical axis 30, the front surfaces 48 extend in the longitudinal direction of the optical axis 30 at an incline thereto, more specifically, in such a manner that they extend towards one another in the direction of propagation 49 of the microwaves as illustrated in FIG. 2.

The first embodiment of the high-pressure, gas-discharge laser according to the invention operates with microwaves which may lie in the range from the L-band to the X-band. A magnetron or a klystron is preferably used as microwave generator 12. All excimer-forming gases may be used as laser gas. These should preferably be present at a pressure of at least 0.5 bar. The energy densities lie above 100 KW per $cm^3$ with respect to the high-pressure gas-discharge volume, i.e., the central area 62.

With these values, a substantially homogeneous high-pressure gas discharge occurs in the central area 62 with no tendency towards wall breakdown and so a laser action of high intensity and mode purity is to be observed along the optical axis 30 in the optical resonator 26 comprising the mirrors 28, the optical axis 30 and the resonator gas volume 52 enclosed by the microwave coupling structure 16 with its extensions 32 and the windows 34.

A variant of this first embodiment 10 is illustrated in FIG. 4. In this case, the microwave coupling structure 16 as such is identical with that of FIG. 3 with the exception that the resonator gas volume 52' does not fill the whole interior of the microwave coupling structure 16 but is enclosed in a gas tube 70 which rests with a bottom tube wall 72 against the front surface 48 of the ridge 42 and with a top tube wall 74 against the front surface 48 of the ridge 44 and which extends laterally in the direction of the side walls 40 so far that its tube side walls 76 are offset with respect to the side surfaces 46 of the ridges 42, 44 in the direction of the side walls 40 of the microwave coupling structure 16. Hence the gas tube 70 also ensures that the resonator gas volume 52' has a central area 62' and an outer area 64' in which the same field conditions exist as in the central area 62 and outer area 64 of the first variant of the first embodiment 10.

The gas tube 70 advantageously extends beyond the input 18 and the output 20 of the microwave coupling structure in the form of extensions 32 and is terminated by the windows 34.

A third variant of the first embodiment 10 is illustrated in FIG. 5. This third variant corresponds essentially to the second variant in FIG. 4 with the difference that the ridges 42" and 44" are not made of conductive material as in FIGS. 3 and 4, but of a dielectric material. With this configuration, however, the same division of the resonator gas volume 52" into a central area 62" and outer areas 64" is achieved.

FIGS. 6 and 7 represent modifications of the first and second variant, illustrated in FIGS. 3 and 4, of the first embodiment 10. Herein, in contrast with FIGS. 3 and 4, the side edges 66, 66' of the ridges 42, 42' are rounded. Also, the side surfaces 46 and 46' may be slightly inclined towards the front surface 48 and 48', respectively, with respect to the vertical. Such variants permit an advantageous formation of the electric field in the central areas 62 and 62' which is more homogeneous than with precisely rectangular ridges 42, 44 and 42', 44' in FIGS. 3 and 4. With regard to the exact shape of the ridges according to FIGS. 6 and 7, reference is made to calculating methods of E. A. Stappaerts in Appl. Phys. Lett. 40 (12) 1982, P. Y. Chang in Review of Scientific Instruments, Vol. 44, (4), page 405, 1973 and W. Rogowski in "Archiv fuer Elektrotechnik", XII, page 1, 1923.

Further variants of the first embodiment 10 are illustrated in FIGS. 8 and 9. In these variants, the bottom ridge 42 is omitted, but the top ridge 44''' and 44'''', respectively, is substantially higher and the optical axis 30 is shifted so far in the direction of the bottom wall 36''' and 36'''', respectively, that it again lies at the center between the front surface 48''' and 48'''' of the ridges 44''' and 44''''. Otherwise, in principle, the same field conditions exist as in all other variants of the first embodiment.

In a second embodiment, illustrated in FIG. 10, only the microwave coupling structure 80 and the optical axis 82 of the optical resonator and the mirrors 84 arranged concentrically therewith are shown in the drawing. The microwave coupling structure 80 has the same crosssection as the microwave coupling structure 16 illustrated in FIG. 3 with the only difference that this microwave coupling structure is helically formed around the optical axis 82 in order to achieve in the central region 86 between the ridges 88 and 89, averaged over the length of the optical resonator, a uniform field distribution in all radial directions in relation to the optical axis. Such a radially symmetrical discharge geometry has the advantage that the intensity and, above all, the mode purity of the laser can be further improved.

A further variant of the second embodiment, illustrated in FIG. 11, shows a special embodiment of the gas tube 92. This likewise comprises a bottom tube wall 94 and a top tube wall 96, but encloses the ridges 88 and 90 along their side surfaces 98, too, and forms at the sides of the ridges 88, 90 an approximately semi-oval tube side wall 100. This configuration of the gas tube 92 has the advantage that it eliminates a wall breakdown much more reliably because the wall surfaces of the gas tube 92 are taken back at the transition between the central area 102 and the outer areas 104 and, therefore, in the area of the abrupt change in the field intensity between the central area 102 and the outer area 104 the resonator gas also has no possibility of breaking down at a wall of the gas tube 92 or of forming the surface waves or screening effects leading to the wall breakdown.

A third embodiment of the high-pressure gas-discharge laser according to the invention, illustrated with several variants in FIGS. 12 to 17, shows a specially designed microwave coupling structure 110. In this microwave coupling structure 110, a waveguide section 112 extending between an input 114 and an output 116 of the microwave coupling structure 110 is likewise disposed between the microwave generator 12 with the waveguide section 14 and the waveguide section 22 with the microwave dump 24. A waveguide resonator 114 with the optical axis 30 of the optical resonator 26 arranged at the center thereof extends parallel to this waveguide section 112. As shown in FIGS. 13, 14 and 16, the cross-sectional design of this waveguide resonator 114 is comparable with that of the first embodiment. The only difference is to be seen in the fact that the length of this waveguide resonator 114 must be adapted to the respective microwave frequency and that in this waveguide resonator 114 the microwaves do not propagate along the optical axis 30, but instead waves stand along the optical axis 30.

FIGS. 13, 14 and 16 now show several different ways of coupling this waveguide resonator 114 to the waveguide section 112.

In the variant in FIG. 13, a side wall 118 of the waveguide section 112 rests against a side wall 120 of the waveguide resonator 114. Throughout the entire length along which they rest against each other, both side walls 118, 120 are provided with a plurality of successive openings 122 by means of which a microwave coupling of the waveguide resonator to the waveguide section 112 is effected.

These openings 122 may be of progressively larger configuration between the input 114 and the output 116 of the microwave coupling structure, thereby to achieve by virtue of different coupling factors along the entire waveguide resonator a field intensity between the ridges 42 and 44 which is always of identical size as indicated, for example, in U.S. Pat. No. 4,513,424.

In the variant according to FIG. 14, the side walls 118 and 120 of the resonator section 112 and the waveguide resonator 114 are removed and replaced by a pressure-tight microwave window which, on the one hand, permits coupling of the waveguide resonator 114 to the waveguide section 112 and, on the other hand, constitutes a pressure-tight wall for the resonator gas volume 52, thereby closing the latter off from the waveguide section 112.

In an embodiment according to FIG. 14, the waveguide resonator 114 should expediently be provided with openings 128 in its end walls 126 in order to enable a laser beam extending parallel to the optical axis 30 to pass through in the direction towards the mirrors 28. Also, the openings 128 themselves are closed by optical windows.

In the variant according to FIG. 16, the microwave window 124 need not be of pressure-tight design, but instead a simple microwave window is adequate because the resonator gas volume 52 is encapsulated in the gas tube 70. In this case, the gas tube 70 advantageously extends beyond the end faces 126 of the waveguide resonator 114 as illustrated in FIG. 17, and is likewise terminated by windows.

A third embodiment, illustrated in FIGS. 18 to 22, shows a microwave coupling structure 130 made up of TEM waveguides. Such TEM waveguides comprise two strip conductors 132 and 134 extending parallel to each other.

These strip conductors 132 and 134 are directed towards each other in order to form a microwave coupling structure 130 and extend in the area of the microwave coupling structure 130 as coupling conductors 136 and 138 at a shorter distance from each other than the strip conductors 132 and 134 before and after the microwave coupling structure 130. The coupling conductors 136 and 138 replace the ridges 42 and 44 in the waveguide structures described above.

A gas tube 140 is arranged between these coupling conductors 136 and 138 so as to protrude laterally beyond the two coupling conductors 136 and 138 and hence likewise enable a central area 144 and an outer area 146 with the same field distribution as in the waveguide resonators to be formed in the resonator gas volume 142.

As illustrated in FIGS. 19 and 20, this gas tube 140 likewise runs parallel to the optical axis 30 of the optical resonator 26 with mirrors 28 which extends centrally through the gas tube 140.

FIGS. 21 and 22 show further different types of design of the coupling conductors 136 and 138.

While the coupling conductors 136, 138 in FIG. 21 have a strictly rectangular cross-section, the coupling conductors in FIG. 22 are rounded in the area of their side edges facing the gas tube 140, similarly to the ridges in the variants according to FIGS. 6 and 7 of the first embodiment. In keeping with the statements made on these specially designed ridge shapes, a more homogeneous field distribution can thereby be obtained in the central area 144.

Resonant microwave coupling structures may, of course, also be made up of TEM waveguides, with coupling to a TEM waveguide through which a travelling wave passes likewise being carried out, preferably via a directional coupler structure.

While in all of the embodiments described so far the microwaves in both structures with travelling waves and structures with standing waves always propagate parallel to the optical axis, in a fifth embodiment of the high-pressure, gas-discharge laser according to the invention, illustrated in FIGS. 23 and 24, provision is made for the microwaves to propagate transversely to the optical axis 30.

Such a design requires provision of a microwave generator 150 from which a funnel-shaped microwave waveguide 152 extends to a microwave coupling structure 154. In this microwave coupling structure 154, the ridges 156 and 158 extend transversely to a coupling direction of the microwaves and parallel to the optical axis 30.

The resonator gas volume 160 may likewise, as in the embodiments with a waveguide structure, either assume the entire interior of the microwave coupling structure 154 or, as illustrated in FIG. 23, be enclosed in a gas tube 162 which likewise again extends laterally beyond the ridges 156 and 158 in order to ensure that the central area and outer areas on both sides thereof are formed in the resonator gas volume 160.

What is claimed is:

1. Microwave-pumped, high-pressure, gas-discharge laser, in particular, excimer laser, with an optical resonator, with a resonator gas volume arranged therein and extending along an optical axis thereof, with a microwave coupling structure enclosing the resonator gas volume within it and with a microwave generator connected to the microwave coupling structure, characterized in that a central area (62, 102) with an electric field intensity being above a threshold value for a high-pressure gas discharge is disposed within the resonator gas volume (52) in a transverse direction to the optical axis (30) and is adjoined on both sides thereof by outer areas (64, 104) with a field intensity being below the threshold value for the high-pressure gas discharge.

2. High-pressure, gas-discharge laser as defined in claim 1, characterized in that the field intensity changes abruptly at the transition from the central area (62, 102) to the outer areas (64, 104).

3. High-pressure, gas-discharge laser as defined in claim 1, characterized in that the resonator gas volume (52) is enclosed by a gas tube (70, 92, 140, 162).

4. High-pressure, gas-discharge laser as defined in claim 3, characterized in that the gas tube (70, 92, 140, 162) is made of dielectric material.

5. High-pressure, gas-discharge laser as defined in claim 1, characterized in that the resonator gas volume (52) is enclosed by the microwave coupling structure (16, 80, 110, 130, 154).

6. High-pressure, gas-discharge laser as defined in claim 1, characterized in that the resonator gas volume (52) extends in the transverse direction to the optical axis (30) beyond the areas (62, 64, 102, 104) penetrated by the electric field intensity.

7. High-pressure, gas-discharge laser as defined in claim 1, characterized in that the field intensity within the central area (62, 102) transversely to the optical axis (30) is constant.

8. High-pressure, gas-discharge laser as defined in claim 1, characterized in that the direction of propagation of the microwaves in the microwave coupling structure (16, 80, 110, 130) extends parallel to the optical axis (30).

9. High-pressure, gas-discharge laser as defined in claim 8, characterized in that the electric field intensity in the central area (62, 102) along the direction of propagation of the microwaves is substantially constant.

10. High-pressure, gas-discharge laser as defined in claim 1, characterized in that the direction of propagation of the microwaves in the microwave coupling structure (154) extends transversely to the optical axis (30).

11. High-pressure, gas-discharge laser as defined in claim 1, characterized in that the microwave coupling structure (16, 80, 130, 154) is a travelling-wave structure.

12. High-pressure, gas-discharge laser as defined in claim 1, characterized in that the microwave coupling structure (110, 154) is a resonant structure.

13. High-pressure, gas-discharge laser as defined in claim 1, characterized in that the microwave coupling structure (16, 80, 110, 130, 154) has arranged above and below the resonator gas volume (52) one conductor (ridge 42, 44, 88, 90, 156, 158; coupling conductor 136, 138) respectively.

14. High-pressure, gas-discharge laser as defined in claim 13, characterized in that a dielectric (42", 44") is arranged between the conductor and the resonator gas volume (52).

15. High-pressure, gas-discharge laser as defined in claim 13, characterized in that at least one of the conductors (42, 44, 88, 90, 136, 138, 156, 158) extends with a constant width in the direction of the optical axis (30) of the resonator gas volume (52).

16. High-pressure, gas-discharge laser as defined in claim 13, characterized in that at least one of the conductors (42, 44, 88, 90, 136, 156, 158) has an approximately rectangular cross-section.

17. High-pressure, gas-discharge laser as defined in claim 13, characterized in that the conductors (42', 44', 136, 138) have profiled cross-sections similar to a Stappaerts, Chang or Rogowski profile.

18. High-pressure, gas-discharge laser as defined in claim 1, characterized in that the microwave coupling structure (110) is coupled to a microwave waveguide by a directional coupler structure.

19. High-pressure, gas-discharge laser as defined in claim 18, characterized in that the directional coupler structure is designed such that a substantially uniform field intensity distribution occurs in the direction of the optical axis (30) in the microwave coupling structure (110).

20. High-pressure, gas-discharge laser as defined in claim 1, characterized in that the microwave coupling structure (16, 80, 110) is a waveguide structure.

21. High-pressure, gas-discharge laser as defined in claim 20, characterized in that the waveguide structure comprises an inwardly protruding ridge (42, 44, 88, 90, 156).

22. High-pressure, gas-discharge laser as defined in claim 20, characterized in that the waveguide structure comprises two opposed ridges (42, 44, 88, 90, 156, 158).

23. High-pressure, gas-discharge laser as defined in claim 22 characterized in that the ridges (42, 44, 88, 90, 156, 158) are of dielectric material.

24. High-pressure, gas-discharge laser as defined in claim 21 characterized in that the ridge is at least one conductor.

25. High-pressure, gas-discharge laser as defined in claim 22 characterized in that both ridges are conductors.

26. High-pressure, gas-discharge laser as defined in claim 21, characterized in that at least one of the ridges (42, 44, 88, 90, 156, 158) has a front surface (48) extending in the longitudinal direction of the optical axis (30) at an incline thereto.

27. High-pressure, gas-discharge laser as defined in claim 1, characterized in that the microwave coupling structure (130) is in the form of a TEM waveguide structure comprising coupling conductors (136, 138).

28. High-pressure, gas-discharge laser as defined in claim 27, characterized in that at least one coupling conductor (136, 138) extends in the longitudinal direction of the optical axis (30) at an incline thereto.

29. High-pressure, gas-discharge laser as defined in claim 1, characterized in that the resonator gas volume (52) is a closed volume.

30. High-pressure, gas-discharge laser as defined in claim 1, characterized in that gas flows through the resonator gas volume (52).

31. High-pressure, gas-discharge laser as defined in claim 1, characterized in that surfaces facing the central area (62, 102) of the resonator gas volume (52) are of non-reflecting design.

32. High-pressure, gas-discharge laser as defined in claim 31, characterized in that the surfaces facing the central area (62, 102) of the resonator gas volume (52) are on conductors (42, 44, 88, 90, 136, 138, 156, 158) of non-reflecting design.

33. High-pressure, gas-discharge laser as defined in claim 31, characterized in that the surfaces facing the central area (62, 102) of the resonator gas volume (52) are on a gas tube (70, 92, 140, 162).

34. High-pressure, gas-discharge laser as defined in claim 1, characterized in that the microwave coupling structure (80) is helically twisted around the optical axis (30).

* * * * *